US008930718B2

(12) United States Patent
Aylward et al.

(10) Patent No.: US 8,930,718 B2
(45) Date of Patent: Jan. 6, 2015

(54) APPARATUS FOR AND A METHOD OF PROVIDING CONTENT DATA

(75) Inventors: Adrian Aylward, Newbury (GB); Mark A Hollar, Palo Alto, CA (US)

(73) Assignee: Rovi Solutions Corporation, Santa Clara, CA (US)

(*) Notice: Subject to any disclaimer, the term of this patent is extended or adjusted under 35 U.S.C. 154(b) by 1248 days.

(21) Appl. No.: 11/729,342

(22) Filed: Mar. 28, 2007

(65) Prior Publication Data

US 2008/0247542 A1    Oct. 9, 2008

(51) Int. Cl.
*G06F 21/00* (2013.01)
*G11B 20/00* (2006.01)
*G11B 27/036* (2006.01)
*G11B 27/10* (2006.01)
*G11B 27/11* (2006.01)

(52) U.S. Cl.
CPC ...... *G11B 20/00086* (2013.01); *G11B 20/0021* (2013.01); *G11B 20/00449* (2013.01); *G11B 20/00478* (2013.01); *G11B 20/005* (2013.01); *G11B 20/00507* (2013.01); *G11B 20/00528* (2013.01); *G11B 20/00659* (2013.01); *G11B 20/00869* (2013.01); *G11B 27/036* (2013.01); *G11B 27/10* (2013.01); *G11B 27/11* (2013.01); *G11B 2220/2562* (2013.01)
USPC ............................ 713/193; 380/200; 380/201

(58) Field of Classification Search
USPC .................................. 380/200, 201; 713/193
See application file for complete search history.

(56) References Cited

U.S. PATENT DOCUMENTS

| 4,405,829 | A | 9/1983 | Rivest et al. |
| 6,021,199 | A | 2/2000 | Ishibashi |
| 6,353,890 | B1 | 3/2002 | Newman |
| 2002/0085714 | A1 | 7/2002 | Inoha et al. |
| 2004/0049688 | A1* | 3/2004 | Candelore et al. ............ 713/191 |
| 2005/0169473 | A1* | 8/2005 | Candelore ..................... 380/239 |

(Continued)

FOREIGN PATENT DOCUMENTS

| JP | 8331508 A | 12/1996 |
| JP | 2000268497 A | 8/2000 |

(Continued)

OTHER PUBLICATIONS

P. Kocher, J. Jaffe, B. Jun, and N. Lawson, Self-protecting digital content, 2003: Cryptography Research, Inc.*
International Search Report for PCT/US2008/003619 mailed Jul. 28, 2008, 1 page.

(Continued)

*Primary Examiner* — Vikkram Bali
*Assistant Examiner* — Tracy Mangialaschi
(74) *Attorney, Agent, or Firm* — Inventive Patent Law P.C.; Jim H. Salter

(57) ABSTRACT

Apparatus and a method are described to enable reading apparatus to access content data of an optical disc such as a DVD where the content data carried by the DVD is encrypted by an encryption technique that requires a decryption key or keys. Reproduced content data corresponding to the encrypted content data is provided and this reproduced content data, at least some of which may be encrypted using a different technique, is made available for access by a reading apparatus. The reproduced content data may be stored on the same optical disc as the encrypted content data or at a different location, for example on a storage medium which may be coupled to the reading apparatus or at a location on a network that can be accessed by the reading apparatus.

13 Claims, 12 Drawing Sheets

(56) References Cited

U.S. PATENT DOCUMENTS

| | | | |
|---|---|---|---|
| 2006/0023598 A1* | 2/2006 | Babinski et al. | 369/53.21 |
| 2006/0078111 A1* | 4/2006 | Hollar | 380/201 |
| 2006/0117191 A1 | 6/2006 | Fukushima | |
| 2007/0067242 A1 | 3/2007 | Lotspiech et al. | |
| 2007/0094679 A1* | 4/2007 | Shuster | 725/31 |

FOREIGN PATENT DOCUMENTS

| | | |
|---|---|---|
| JP | 2000348003 A | 12/2000 |
| JP | 2001103047 A | 4/2001 |
| JP | 2004519807 A | 7/2004 |
| JP | 2005-217794 | 8/2005 |
| JP | 2006048362 A | 2/2006 |
| JP | 2006-285607 | 10/2006 |
| WO | WO 00/74053 | 12/2000 |
| WO | WO 01/61695 | 8/2001 |
| WO | WO 01/61696 | 8/2001 |
| WO | WO 02/11136 | 2/2002 |
| WO | WO-0273616 A1 | 9/2002 |
| WO | WO-03015093 A1 | 2/2003 |
| WO | WO-2006009221 A1 | 1/2006 |
| WO | WO-2008121243 A1 | 10/2008 |

OTHER PUBLICATIONS

"European Application No. 08726993.2, Extended Search Report mailed Nov. 2, 2011", 10 pgs.

"European Application Serial No. 08726993.2, Office Action mailed Nov. 21, 2011", 1 pgs.

"International Application Serial No. PCT/US2008/003619, International Preliminary Report on Patentability mailed Sep. 28, 2009", 5 pgs.

"International Application Serial No. PCT/US2008/003619, International Search Report mailed Jul. 28, 2008", 2 pgs.

"International Application Serial No. PCT/US2008/003619, Written Opinion mailed Jul. 28, 2008", 4 pgs.

"Japanese Application Serial No. 2010-500928, Office Action mailed Nov. 14, 2011", 23pgs.

"Japanese Application Serial No. 2010-500928, Office Action mailed Mar. 23, 2012", With English Translation, 13 pgs.

"Japanese Application Serial No. 2010-500928, Office Action mailed Aug. 12, 2011", 13 pgs.

"More About DeCSS", Retrieved from http://www.lemuria.org/DeCSS/decss.htm, Retrieved Dec. 6, 2006, (Sep. 14, 2005).

"SOFTCD: Solving the Information Bottleneck", Online Information Review, 22(6), (1998), 403-406.

* cited by examiner

APPARATUS FOR AND A METHOD OF PROVIDING CONTENT DATA

FIELD OF THE INVENTION

This invention relates to an apparatus for and a method of providing digital content data, for example for recordal on a recording medium such as an optical disc (or precursor to an optical disc) or other recording medium from which content data can be accessed in a non-sequential manner using navigational data stored by the recording medium, to a recording medium carrying such digital content data and to such digital content data. For simplicity, a recording medium such as an optical disc (or precursor to an optical disc) or other recording medium from which content data that can be accessed in a non-sequential manner using navigational data stored by the recording medium is referred to hereinafter simply as a "recording medium".

BACKGROUND OF THE INVENTION

The advent of digital recording techniques has enabled digital copies of digital content carried by recording media such as optical discs (for example DVDs) to be made with little or no loss of copy quality. This makes it easy for an unauthorised person to produce unauthorised copies of digital content-carrying recording media. Accordingly, copy-protection techniques have been developed. One copy protection technique that is currently used to protect the content of DVDs from digital copying is the proprietary Content Scrambling System (CSS) in which some frames or sectors containing audio, video or sub-picture data of a video title set are scrambled and encrypted using a combination of a title key and a disc key. The title key is stored in the sector header and the disc key is stored in a control area of the disc which is not accessible to a player that does not have a CSS decryption module. Each CSS-protected DVD also includes a list of player keys to enable identification of players licensed under the CSS system. When a CSS-protected disc is inserted into a CSS-licensed player, a CSS decryption module of the player exchanges player keys with the disc and, if the player key of the player matches one of the player keys in the list carried by the disc, an encryption key is generated from the player keys for use in encrypting the transfer of the disc and title keys to the player to enable the CSS decryption module to decrypt the CSS encrypted sectors. Encrypting the transfer of these keys inhibits interception of the transferred data. An unlicensed player, that is a player without the CSS decryption module (or a player without a legitimate player key) will not be able to decrypt the CSS encrypted sectors and so at least part of the content of the DVD will not be playable. This copy-protection system requires both the producer of the recorded medium and the producer of the player of the recorded medium to be licensed to implement the CSS protection system. Similar considerations apply to other proprietary protection systems.

SUMMARY OF THE INVENTION

An embodiment provides apparatus to provide content data, the apparatus comprising a content reproducer to provide reproduced content data, an encrypter to encrypt content data to produce encrypted content data such as CSS encrypted content data for recordal on a recording medium, and a reproduced content data provider to provide the reproduced content data for access by a reading apparatus in place of the encrypted content data.

An embodiment provides apparatus to obtain content data, the apparatus comprising an identifier to identify encrypted content data such as CSS encrypted content data, and a reproduced content data obtainer to obtain content data to replace the encrypted content data.

An embodiment provides a method of providing DVD content data, the method comprising reproducing content data to produce reproduced content data and providing the reproduced content data for access by a reading apparatus in place of the same content data encrypted by, for example, CSS encryption.

An embodiment provides a method of obtaining content data, the method comprising identifying encrypted content data such as CSS encrypted content data on a DVD, and obtaining content data to replace the encrypted content data.

An embodiment provides apparatus and a method for providing content data that enables a reading apparatus that does not have a CSS decryption module to read a recorded medium which carries content that has been encrypted using the CSS encryption system.

An embodiment provides apparatus and a method for providing content data that enables a reading apparatus that does not have a CSS decryption module to read a recorded medium which carries content that has been encrypted using the CSS encryption system while providing protection against digital copying.

An embodiment provides apparatus and a method for providing content data that enables a reading apparatus that does not have a CSS decryption module to read a recorded medium which carries content by enabling the reading apparatus to access a copy of the content data of a CSS-protected sector of the recorded medium. In an embodiment, the copy is encrypted using a different encryption scheme than CSS. The copy may be stored ("hidden") in a part of the recorded medium that is not accessible to a reading apparatus unless the reading apparatus has access software or an access module specifically designed to provide access to such a hidden copy. As another possibility or additionally, the copy may be stored at a different location, that is not on the recording medium, and the reading apparatus configured by access software or an access module to access that copy, for example the copy may be stored in a data base accessible by the reading apparatus via a network such as the Internet.

An embodiment enables reading apparatus to access content data of an optical disc such as a DVD where the content data carried by the DVD is encrypted by an encryption technique that requires a decryption license. Reproduced content data corresponding to the encrypted content data is provided and this reproduced content data, at least some of which may be encrypted using a different technique, is made available for access by a reading apparatus. The reproduced content data may be stored on the same optical disc as the encrypted content data or at a different location, for example on a storage medium which may be coupled to the reading apparatus or at a location on a network that can be accessed by the reading apparatus.

The invention also provides a method of providing such content data, the content data itself and a recording medium carrying the content data. The recording medium may be an optical disc such as a DVD or a precursor thereof such as Digital Linear Tape, glass master, or stamping master, or may be any other form of recording medium from which content data that can be accessed in a non-sequential manner using navigational data stored by the recording medium.

BRIEF DESCRIPTION OF THE DRAWINGS

Embodiments of the present invention will now be described, by way of example, with reference to the accompanying drawings, in which.

DETAILED DESCRIPTION OF EMBODIMENTS

Embodiments of apparatus and methods will now be described that enable reading apparatus to access content data of an optical disc such as a DVD where the content data carried by the DVD is encrypted by an encryption technique that requires a decryption key or keys. Reproduced content data corresponding to the encrypted content data is provided and this reproduced content data, at least some of which may be encrypted using a different technique, is made available for access by a reading apparatus. The reproduced content data may be stored on the same optical disc as the encrypted content data or at a different location, for example on a storage medium which may be coupled to the reading apparatus or at a location on a network that can be accessed by the reading apparatus.

Figure 1:
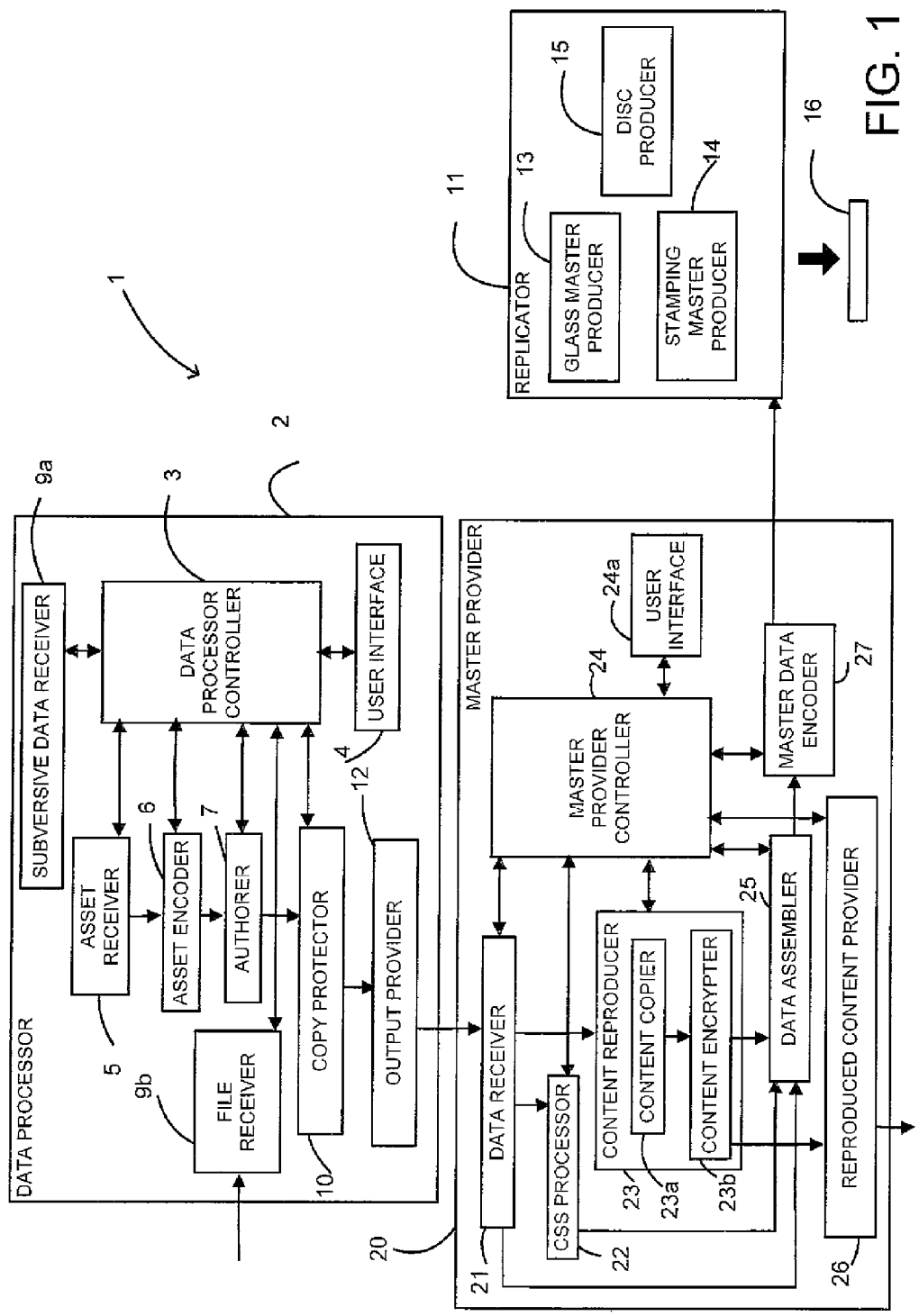
FIG. 1 shows a functional block diagram of producing apparatus for producing a recorded optical disc such as a DVD.

Referring now to FIG. 1, a producing apparatus 1 has a data processor 2 operable, under user control, or possibly automatically, to provide recording data to be recorded onto an optical disc, in this case a Digital Versatile Video Disc (DVD-Video, abbreviated to DVD herein), a master provider 20 operable to provide a master file and a replicator 11 for producing DVDs using a master file provided by the master provider 20. It will be appreciated that the data processor 2, the master provider 20 and the replicator 11 need not necessarily be provided at the same location but may be at different geographical locations and may communicate via a network or data may be physically transported between them on, for example, Digital Linear Tape (DLT).

The data processor 2 has a data processor controller 3 to control overall operation of the data processor 2, a user interface 4 to provide a user with information and to receive instructions from the user, an asset receiver 5 to receive assets (such as a video data file or data files plus any additional audio data files and graphics data files for logos, menus and the like) selected by the user to form the content of the DVD and an asset encoder 6, operable, under the control of the data processor controller 3 and in accordance with user instructions received via the user interface 4, to effect any required encoding of the assets to ensure that the assets are in a format specified by the DVD standard with which the DVD is to comply, for example MPEG 2 for video data.

The data processor also has an authorer 7 that enables the user, via the user interface 4, to specify parameters of the DVD being produced such as the video format and disc size, to import encoded assets from the asset encoder 6, to synchronise assets, and to add chapter points, create menus and so on to ensure that the final DVD has the required presentation data (that is the audio and video content data to be delivered to a viewer by a DVD player) and navigation data (comprising general control data, search control data, user interface control data and navigation control data) to enable navigation through the content of the DVD in a non-sequential manner in accordance with the appropriate DVD standard. The authorer 7 thus, under user control, multiplexes the assets, adds navigation and control information according to the appropriate DVD standard specification and writes out an authored data file (that is the disc image or DDP (Disc Description Protocol) File Set) containing the appropriate DVD specification data files in a directory. The authorer 7 is generally also able to simulate the resulting DVD so that the user can review and check their work.

The data processor 2 may also have a file receiver 9b to receive an already authored data file.

The data processor 2 may also have a copy protector 10 to provide copy protection and/or digital rights management (DRM) to an already authored data file provided by the authorer 7 or by the file receiver 9a. As another possibility, the authorer may be configured to provide copy protection. An output provider 12 is provided to output a data file to the master provider 20.

The master provider 20 has a master provider controller 24 to control overall operation of the master provider 20 and may have a user interface 24a to enable interaction with a user or may be configured to receive instructions via the data processor 2. The master provider 20 has a data receiver 21 to receive data files from the data processor 2 (or another source), a CSS processor 22 to CSS scramble and encrypt content data frames or sectors flagged for CSS encryption in the authored data file (DPP File Set), a content reproducer 23 to reproduce the content data of content data sectors flagged for CSS encryption, a data assembler 25 to assemble content data sector data to provide a modified authored data file to be recorded. The master provider 20 also has a master data encoder 27 to carry out conventional mastering processes including encoding the modified authored data file (DPP File Set) in accordance with the appropriate DVD standard specification to produce channel code data for recording, that is the master data encoder 27 is provided to carry out processes such as scrambling, interleaving, error correction and EFM plus encoding in accordance with the appropriate DVD standard specification.

As shown in FIG. 1, the content reproducer 23 has a content copier 23*a* to reproduce or copy the content data of flagged sectors to be CSS encrypted and a content encrypter 23*b* to encrypt the copied content data using a different encryption technique. Any suitable known encryption technique may be used, for example, AES (Advanced Encryption Standard) or RSA (see for example U.S. Pat. No. 4,405,829). The content encrypter 23*b* may also be configured to add digital rights management (DRM) features to the reproduced or copied content data, for example DRM features as described in U.S. Pat. No. 6,353,890, the whole contents of which are hereby incorporated by reference.

The master provider 20 is configured to at least one of: 1) cause the reproduced content data provided by the content reproducer 23 to be recorded in a part of the DVD not usually accessible by a reading apparatus or player; and 2) cause the reproduced content data provided by the content reproducer 23 to be provided to a content storer device for subsequent access by a reading apparatus or player.

Where the master provider 20 is configured to cause the reproduced content data provided by the content reproducer 23 to be recorded in a part of the DVD not usually accessible by a DVD playing apparatus, the data assembler 25 is configured to assemble the reproduced sector content data with the CSS-encrypted content data sector data provided by the CSS processor 22 and non-CSS-encrypted content data sector data provided by the data receiver 21 and to provide a modified authored data file (DPP File Set) so that, upon recordal, the reproduced content data is located in an area or areas of the DVD not normally accessible (a "hidden" area) by a reading apparatus or player and so that the reproduced content data for each sector is associated with identification data that relates the copied content data to that sector, for example a simple table mapping original CSS-scrambled sectors to replacement encrypted sectors may be provided. Such a hidden area may be for example a control area or a sector of the DVD not on a navigational path of the DVD or the table may be hidden by omitting it from the file system directory. The address of this hidden area may be stored in a reserved field in the ISO primary volume descriptor.

Where the master provider 20 is configured to cause the reproduced content data provided by the content reproducer 23 to be provided to a content storer for subsequent access, the master provider 20 will have a reproduced content provider 26 to: 1) assemble all of the reproduced sector content data with the reproduced content data for each sector associated with identification data that relates the copied content data to that sector; and 2) to associate the assembled reproduced sector content data with data identifying the particular DVD that is to be recorded so that this identified reproduced content data can be stored by a content storer at a storage location under a storage reference or identification related to the particular DVD to enable the reproduced content data to be accessed on the basis of data identifying the particular DVD.

The replicator 11 will normally, although not necessarily, be located remotely of the remainder of the producing apparatus and will generally have a glass master producer 13 to cut a glass master, a stamping master producer 14 to produce stamping masters from the glass master, and a disc producer 15 to produce the final DVD discs 16 from the stamping masters.

The data processor 2 may include a subversive data receiver 9*a* operable to receive subversive data to enable inhibition of unauthorised copying. Subversive data is data that detrimentally affects at least one of the copying process, copy quality and playability of a copy and that is incorporated in a part of the digital data that does not form part of the navigational path of the DVD so that the subversive data is ignored by a legitimate player but detrimentally affects the production of an unauthorised copy. Such subversive data may subvert the reading capabilities of a drive attempting to read that area. As an example, data may be altered to affect the digital sum value (DSV) of some of the digital data in a manner which does not affect a legitimate player but interferes with an unauthorised copying apparatus or "ripper". Another possibility may be add subversive data later in the production process, for example by injecting non-correctable errors in the EFM+ bitstream during operation of the master data encoder 27, or by causing the glass master producer deliberately to damage areas of the glass master (and thus of the resultant DVDs) that do not form part of the navigation path in an attempt to make any copy DVD unplayable. These techniques may be used individually or in any combination. Examples of subversive data that may be used are described in, for example, WO02/11136, WO00/74053, WO01/61695 and WO01/61696, the whole contents of each of which are hereby incorporated by reference.

The DVD resulting from the authoring and mastering processes has a physical or presentation data structure which determines the manner in which data provided in physical cells is organised on a DVD with, in accordance with the DVD standards, data being stored in a sequential and physically contiguous or sequential manner on the DVD and an overlying hierarchical logical structure which determines the grouping of video sequences and the play back order of blocks of video in a sequence.

The logical structure defines a video manager (VMG) and one or more video title sets (VTS) each of which will usually have a language folder and one or more title folders each having has at least one program chain (PGC) which may have pre- and post-commands that can be used to define the order in which the program chains are accessed by a player and which contains program chain information (PGCI) comprising navigation data which controls access to components of a program chain. Each program has one logical cell or a sequence of logical cells that map to a corresponding physical cell or physical cells of the presentation data structure.

The final data recorded on a single layer DVD consists of a lead-in section, ISO/UDF file system information (in accordance with ISO9660/UDF (Universal Disc Format)) so that a DVD reading apparatus player can subsequently locate and therefore access each sector of the disc, one more DVD zones and a lead out. A DVD video zone consists of a video manager followed by one or more video title sets. The video manager consists of video manager information (VMGI) comprising navigation data for the entire DVD video zone, a video manager menu video object set (VMGM_VOBS), and a back up file of the video manager information (VMGI BUP). Each video title set (VTS) consisting of video title set information (VTSI) comprising navigation data to control the presentation of titles and menus in the video title set, a menu video object set for any video title set menu video objects (VTSM_VOBS), a video title object set (VTS_TT_VOBS) for the video title set and a back up of the video title set information (VTSI BUP). Each video object set (VOBS) consists of a sequence of physical cells. Each physical cell consists of one or more video object units (VOBUs) each consisting of a navigation pack (NV_PCK) followed by an integer number of video (V), audio (A) and sub-picture (S) packs. On a DVD, each pack occupies one sector of user data on the disc (2048 bytes). Each video/audio pack consists of a pack header identifying the pack followed by a packet header identifying the packets within the pack and then the data in accordance with the DVD format. Each navigation pack (NV_PCK) consists of a pack header identifying the pack, followed by a system header and two navigation data packets one with presentation control information (PCI) for controlling control menu display and program presentation in real time and the other with data search information (DSI) for controlling forward/reverse scanning and seamless branching.

Figure 2:
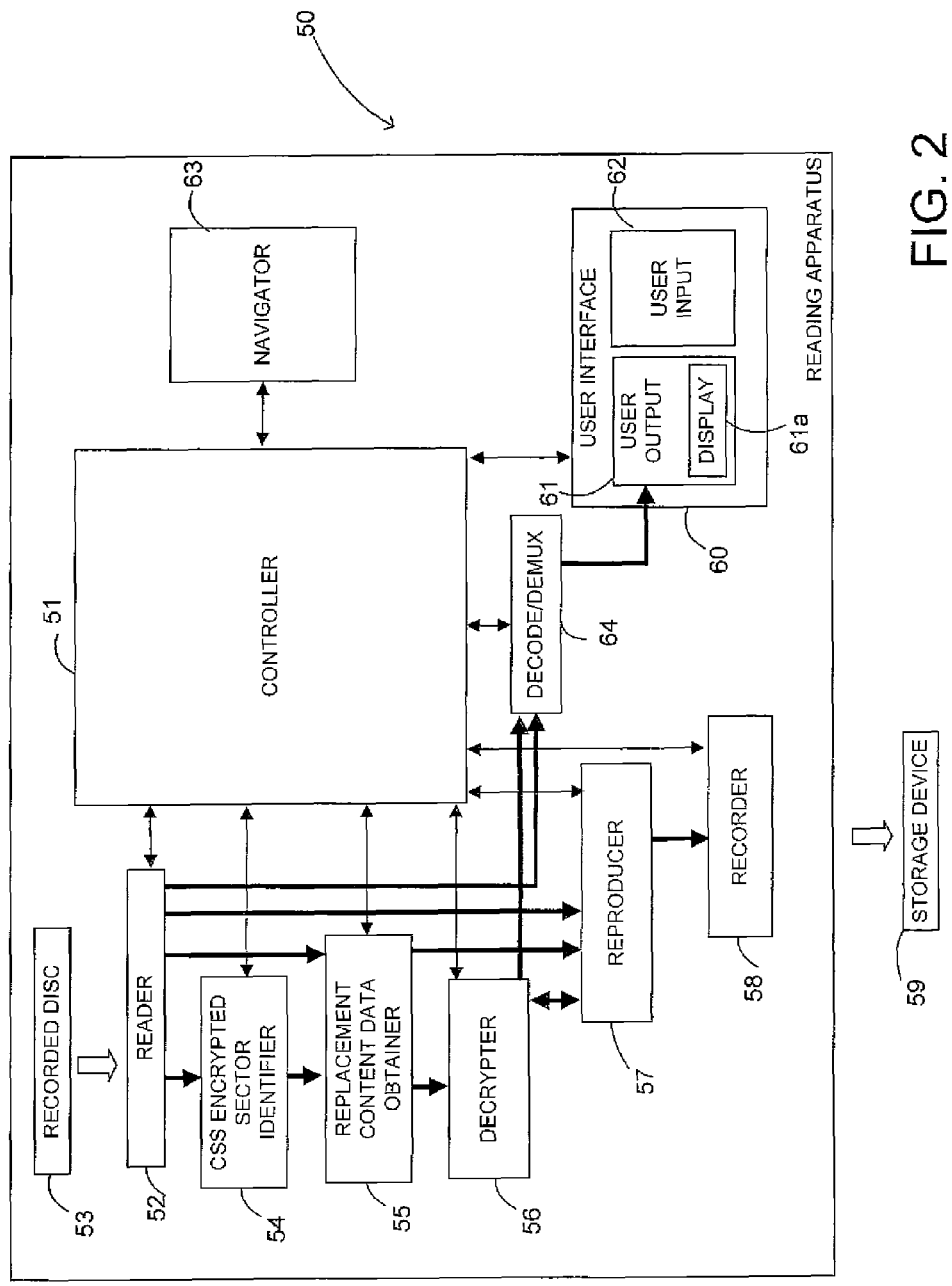
FIG. 2 shows a functional block diagram of reading apparatus for reading a recorded optical disc produced by the apparatus shown in FIG. 1.

FIG. 2 shows a block diagram of reading apparatus 50. The reading apparatus 50 may be a personal or other computer having DVD reading capability in the form of a DVD drive, but could also be a dedicated DVD player. The reading apparatus 50 has a reader 52 with read head circuitry operable to read sectors of data from a recorded disc or DVD 53 and a data decoder operable to decode channel code data read by the read head circuitry. Although not shown in FIG. 2, as is conventional, the data decoder has a clock extractor for extracting a clock signal, a de-interleaver or de-shuffler for de-shuffling sectors and a channel decoder for decoding the channel code data. The reading apparatus also has decoding/demultiplexing circuitry 64 coupled to the reader 52 to produce the audio and video data streams to be supplied to a video display 61a of a user output 61 of a user interface 60 so that the user can play and watch the title(s) carried by the DVD.

The reading apparatus 50 has a controller 51 to control overall operation of the reading apparatus 50. In the interests of clarity in FIG. 2, lines showing data flow are shown thicker than lines indicating control by the controller 51. The controller 51 includes or as shown is associated with a navigator 63 to control the location on a DVD 53 that is read by the read head circuitry of the reader 52 in accordance with, for example, user input instructions received via a user input 62 (which may be a keyboard, pointing device and/or a remote control, for example) of the user interface 60 and navigation or control data read from the DVD by the reader 52.

The functionality of the reading apparatus so far described is that which will be provided by any dedicated DVD player or computer with DVD reading capability. In addition to this functionality, the reading apparatus 50 also has a CSS encrypted sector identifier 54 to identify CSS encrypted sectors, a replacement content data obtainer 55 to obtain replacement content data for CSS-encrypted sectors, and a decryptor 56 to decrypt replacement content data obtained by the replacement content data obtainer 55 and to supply, under control of the controller 51, decrypted replacement content data to the decoding and demultiplexing circuitry 64 in place of the corresponding CSS encrypted content data so that the reading apparatus can play the title to the user without the need to decrypt the CSS encrypted content data. Thus, the reading apparatus can play a DVD title even where that title is CSS-encrypted and the reading apparatus 50 is not licensed to decrypt CSS-encrypted DVD titles.

The reading apparatus 50 may alternatively or additionally be capable of producing a copy of the title(s) carried by the DVD in which the CSS-encrypted content data are replaced by the encrypted content data produced by the content reproducer, provided that copy production is allowed by any copy protection/digital rights management (DRM) features which may be any one or more of: provided on the DVD; associated with the reproduced or copied content data; associated with the reading apparatus; and associated with the storage device on which the copy is to be stored.

Where the reading apparatus 50 is capable of producing such a copy, then the reading apparatus 50 will have a reproducer 57 coupled to the reader 52 and the replacement content obtainer 55 to receive data read from the DVD by the reader 52, to replace any CSS encrypted data with the corresponding encrypted reproduced content data and to store the resultant copy file. Exceptionally, the reading apparatus may be capable of producing a copy in which none of the content data is encrypted; in which case the reproducer 57 will be coupled to the decryptor 56 and configured to replace any CSS encrypted data with the corresponding decrypted reproduced content data. Normally, however, such a copy would incorporate another copy protection mechanism to inhibit copying.

A copy may be produced by the reading apparatus for later playback (time shifting) in which case the reproducer 57 may be coupled (as shown in FIG. 2 via the decryptor where the copy includes encrypted content data) to the decoding/demultiplexing circuitry to enable the copy to be played, after decryption where necessary by the decryptor 56, to the user of the reading apparatus. As another possibility, the reading apparatus may be capable of recording onto a removable or external storage device 59 (such as a portable media player which may be a solid state storage device or a portable hard disc drive storage device). In such a case, the reading apparatus 50 will have a recorder 58, coupled to the reproducer 57, to carry out any appropriate file format conversion and/or compression and to record the reproduced title or titles on the storage device 59.

As set out above, whether or not production of such copies is permitted may depend upon copy-protection/digital right management features carried by the DVD and/or the reading apparatus, for example copy-protection/digital right management features may prohibit copy production unless the reading apparatus and/or the storage device has a copy license from, for example, the content owner or distributor of the DVD. Such copy-protection/digital right management features may control not only the type of copying allowed (for example time shifting, or long-term storage by the reading apparatus or storage on another storage device) but also the number of copies, for example such copy-protection/digital right management features may control the reproducer 57 to cause the produced copy to be protected against second and subsequent generation copy production. Where a DVD carries subversive data as discussed above, such a license may enable the controller 51 to control the reader to ensure that any subversive data on the DVD is not read by the reader 52.

It will of course be appreciated that the functional components shown in FIGS. 1 and 2 simply illustrate the provided functionality and should not be taken to imply that these functional components necessarily exist as discrete physical entities. Rather, the functionality may be provided by one or more physical components and, in the latter case, the functionality provided by a single functional component shown in FIG. 1 or 2 may be distributed between different physical components. In addition, different aspects of the functionality may not be identifiable as separate functionality.

The functional components shown in FIGS. 1 and 2 may, as appropriate, be provided by hardware, firmware, software or any combination of these.

As set out above the reproduced content data may be recorded in a part of the DVD not usually accessible by a player, that is a hidden area. In such a case, the replacement content data obtainer 55 of the reading apparatus 50 will be configured with data identifying the area of the DVD in which the reproduced content data is expected to be located, for example a simple table mapping original CSS-scrambled sectors to replacement encrypted sectors may be provided.

The address of the table may be stored in a fixed location on the disc, or in one of the reserved areas in the filing system headers.

Where the reproduced content data is stored in a content storer separate from the DVD then the replacement content data obtainer 55 will be configured to access that storage device. Such a content storer could be for example a portable storage device (such as a solid state or hard disc drive storage device or an optical disc storage device) from which the reproduced content data may be read by an appropriate storage device reader of the replacement content data obtainer 55. As another possibility, the content storer may be accessible via a network.

Figure 3:
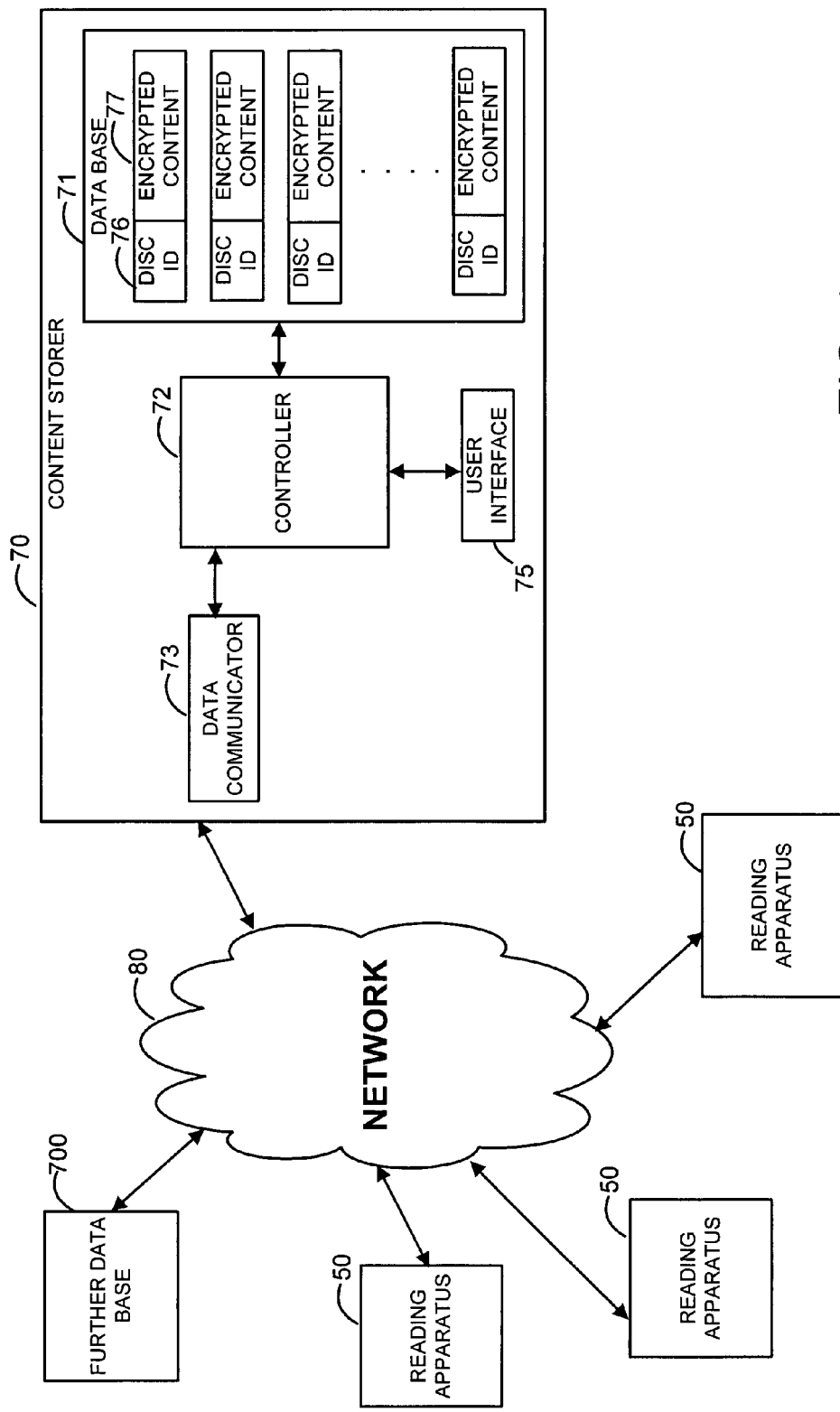
FIG. 3 shows a diagram to illustrate communication between the reading apparatus shown in FIG. 2 and a content storer via a network such as the Internet.

FIG. 3 shows a diagram illustrating an arrangement where the replacement content data obtainer 55 is configured to access a content storer via a network 80 which may be a local area network, a wide area network, an intranet or the Internet, for example. A number of reading apparatus 50 may be coupled to the network. As an example FIG. 3 shows three different reading apparatus 50 which may each have the functionality described above with reference to FIG. 2 to enable them to communicate with a content storer 70 via a network 80.

As shown in FIG. 3, the content storer 70 has a controller 72 to control overall operation of the content storer, a data communicator 73 such as MODEM or the like to enable communication via the network 80 with a reading apparatus 50 and a data base 71 storing, for one or more DVDs, the encrypted reproduced sector content data 77 under a disc ID or DVD ID 76. The content storer 70 may also have a user interface 75 to enable interaction with a user, for example to allow local updating of the data base 71. The content storer 70 may be able to communicate with a further data base 700 storing, again under disc or DVD IDs, the encrypted reproduced sector content data for further DVDs.

Figure 4:
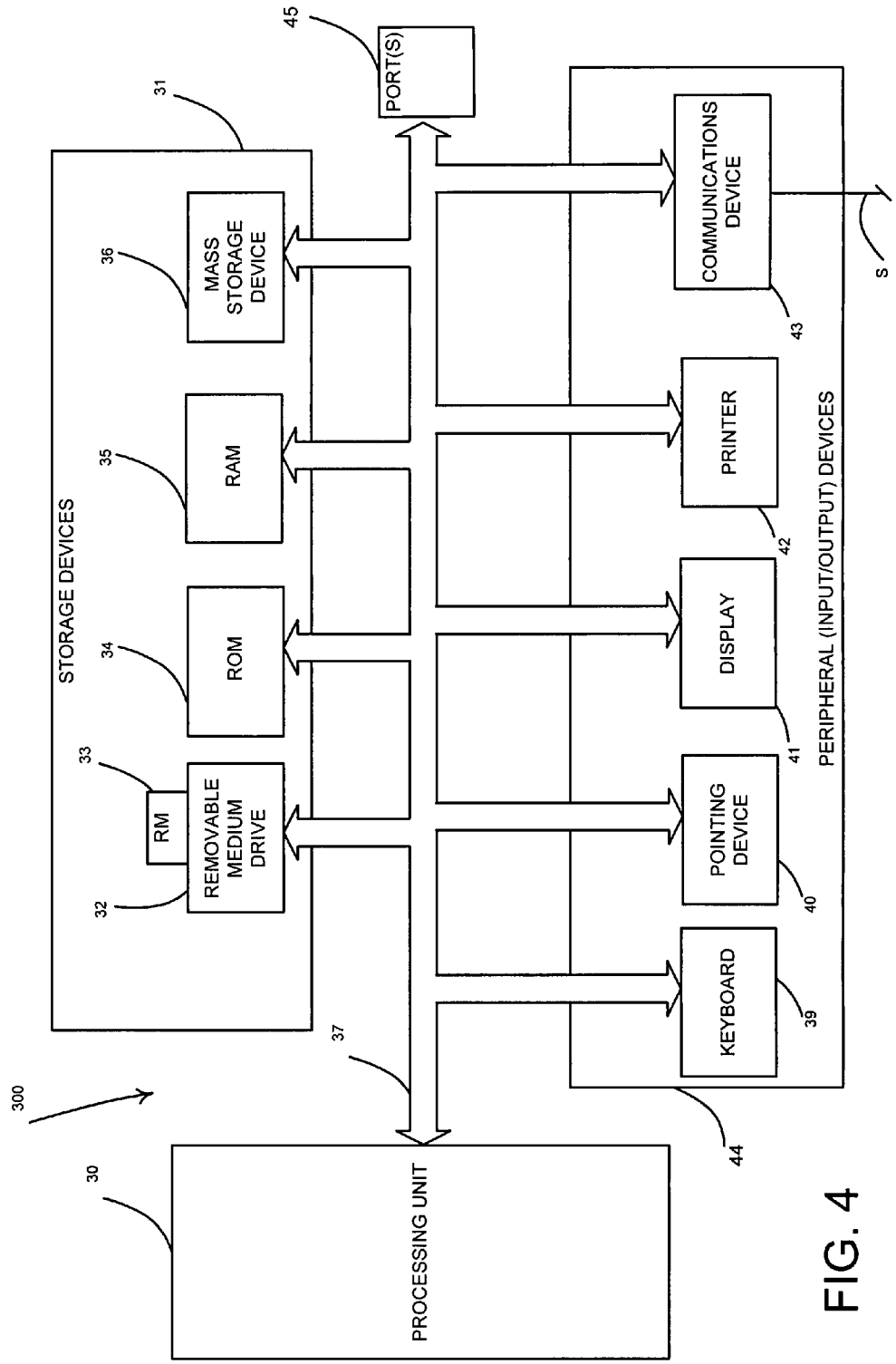
FIG. 4 shows a functional block diagram of computing apparatus that may be programmed to provide the apparatus shown in FIG. 1, 2 or 3.

FIG. 4 shows a functional block diagram of computing apparatus 300 that may be programmed by program instructions to provide, for example, at least one of the data processor 2 and master provider 20 shown in FIG. 1 and/or the reading apparatus 50 shown in FIG. 2.

The computing apparatus 300 comprises a processing unit 30 coupled by one or more buses 37 to storage devices which comprise a removable medium drive 32 for receiving a removable medium RM 33 (depending upon the apparatus the removable medium drive 32 may be one or more of a DVD drive for receiving a DVD, other optical storage device drive, a Digital Linear Tape (DLT) drive, a floppy disc and so on), a read only memory (ROM) 34, a random access memory (RAM) 35 and a mass storage device 36 such as a hard disc drive. The removable medium drive 32 may also have one or more ports such as a USB port to receive an external storage device.

The bus 37 also couples the processing unit 30 to a user interface 44 comprising appropriate peripheral input/output devices. The particular input/output device(s) will depend upon the particular apparatus and may be any one or more of a keyboard 39, a pointing device 40, a display 41, a printer 42, a remote control (not shown), output port or ports 45, and a communications device or devices 43, for example a MODEM, network card or the like, for enabling the computing apparatus 300 to communicate over a network (which may be the Internet but could alternatively or additionally be an intranet, a local area network, wide area network or any other suitable form of network) or for allowing communication in accordance with a wireless protocol, for example using infra red or radio frequency communication. The computing apparatus may also have one or more ports(for example USB ports) for coupling to external devices such as storage devices.

It will, of course, be appreciated that the storage devices and input/output devices may not comprise all of those shown in FIG. 3 and/or could comprise additional devices, for example other input/output devices such as a microphone and a loudspeaker may be provided.

Figure 5:
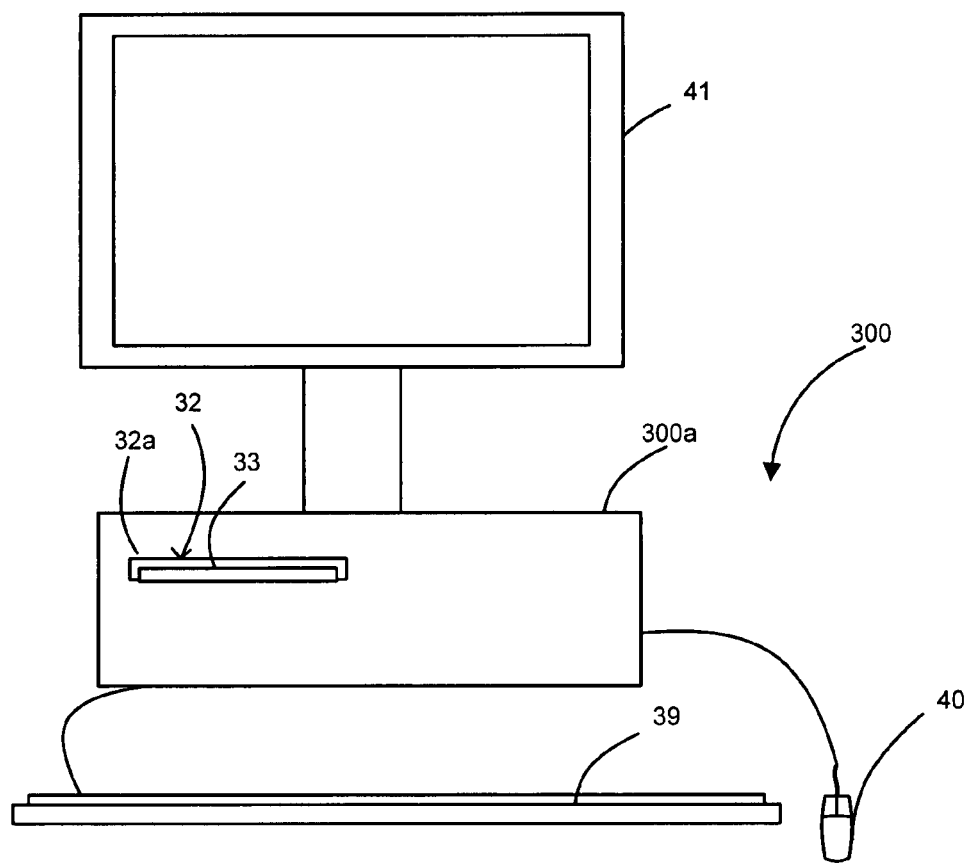
FIG. 5 shows a diagram illustrating an example of computing apparatus having the functionality shown in FIG. 4.

As shown diagrammatically in FIG. 5, the computing apparatus 300 may be a computer such as a personal computer which has a main processor unit 300a containing the processing unit 30 and storage devices 31 and user interface devices in the form, as shown, of a keyboard 39, mouse 40 and display 41. FIG. 5 shows a removable medium 33 being ejected from an insertion slot 32a of the removable medium drive 32.

The computing apparatus 300 may be programmed to provide the data processor and/or master provider shown in FIG. 1 or the reading apparatus shown in FIG. 2 or the content storer 70 shown in FIG. 3 by program instructions supplied by any one or more of the following routes:

1. pre-stored in the ROM 34 and/or or the mass storage device 36;
2. input by a user using an input device such as the keyboard 39 and/or the pointing device 40.
3. downloaded from an external storage device or a removable medium 33 received by the removable medium drive 32; and
4. supplied as a signal S via the communications device(s) 43.

Of course, where apparatus has different physical components, then these may be provided by programming of corresponding respective computing apparatus.

The producing apparatus described above enables copies of CSS encrypted content data to be made accessible to a reading apparatus that does not have a CSS decryption module so that that reading apparatus can read a recorded medium which carries content that has been encrypted using the CSS encryption system and enables, where desired, the copies of CSS encrypted content data to be encrypted using a different technique to provide protection against digital copying.

Operation of the producing and reading apparatus will now be described.

Figure 6:
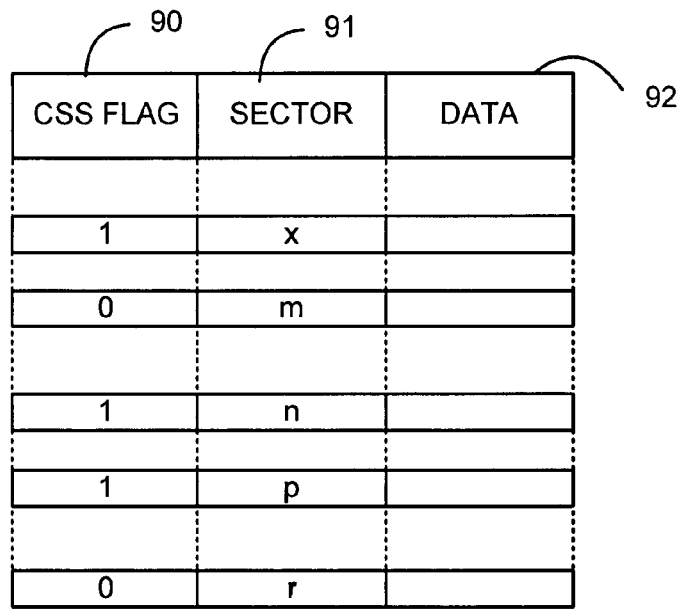
FIG. 6 shows a simple diagram to show CSS encryption flags.

The data processor 2 shown in FIG. 1 operates in accordance with user instructions input via the user interface 4. For example, the data processor 2 may encode assets and/or carry out an authoring process in which the user assembles the assets in the manner he or she desires with user-defined chapters and menus and a user-defined navigation path or paths through the content data and the authorer 7 multiplexes the user selected and organised assets and adds navigational and control data and CSS flags in compliance with the user's instructions and provides an authored file (image file or DDP File Set) containing the VOB, IFO, BUP files. FIG. 6 shows a simplified example of a data table of the authored file having CSS flag, sector and sector data columns 90, 91 and 92 in which the flag is set to 1 to indicate that the content data is to be CSS encrypted and to 0 to indicate that CSS encryption is not required. The sectors flagged for CSS encryption during the authoring process may be selected by the user or may be selected automatically by the master provider 20 or by the authorer in accordance with a selection policy determined by the user.

The copy protector 10 may incorporate subversive data as discussed above and/or may add digital rights management features. The copy protector 10 may carry out other copy protection processes, for example to add a digital fingerprint and/or watermark data. Subversive data may, depending upon the type of subversive data, alternatively or additionally be added at prior to encoding of the assets and/or by deliberately physically damaging a sector or sectors of the disc during production of the glass master, for example.

The output provider 12 outputs the authored file as modified by the copy protector 10 to the data receiver 21 of the master provider 20.

An authored file output by the output provider 12 is received by the data receiver 21 of the master provider 20 which operates under the control of the master provider controller 24 (either automatically or in accordance with user input via the user interface 24a) to produce a master file from which the resulting DVD is produced by the replicator 11.

The general operation of the master provider 20 shown in FIG. 1 to provide content data to replace CSS-encrypted content data and the reading apparatus shown in FIG. 2 to obtain that replacement content data will now be explained with the aid of FIGS. 8 to 10.

Figure 8:
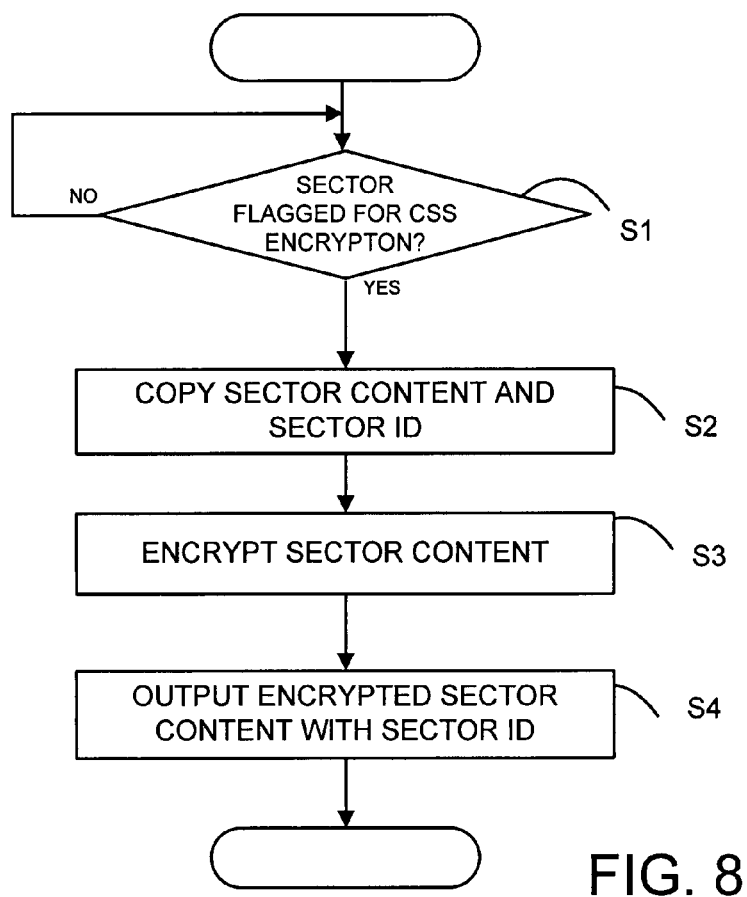
FIG. 8 shows a flow chart for illustrating operations carried out by a content reproducer of the producing apparatus shown in FIG. 1.
Figure 9:
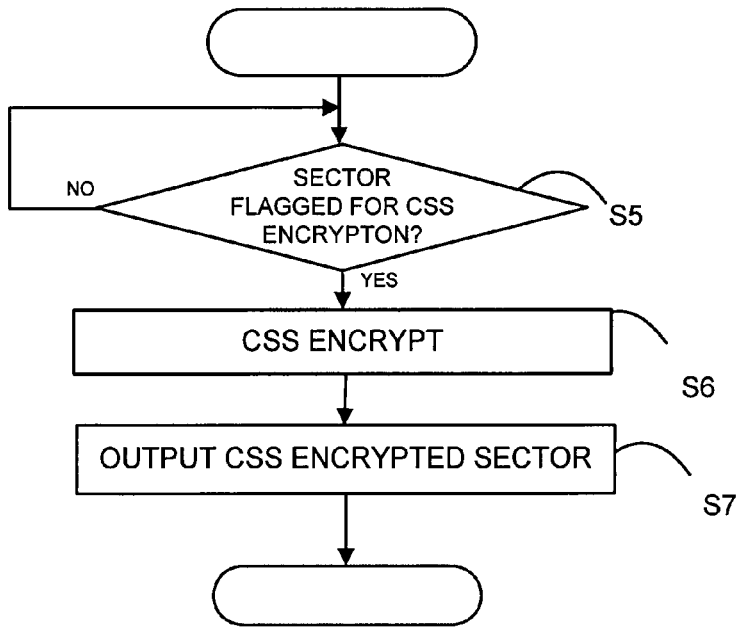
FIG. 9 shows a flow chart for illustrating operations carried out by a CSS processor of the producing apparatus shown in FIG. 1.

FIGS. 8 and 9 show flowcharts providing an overview of the processes carried out by the content reproducer 23 and the CSS processor 22, respectively. The content reproducer 23 and the CSS processor 22 may operate in parallel or in either order provided of course that a copy of the content data of a sector flagged for CSS encryption during the authoring process is made before the CSS encryption is carried out.

When at S1 in FIG. 8, the content reproducer 23 determines from the table shown in FIG. 6 that a sector has been flagged for CSS encryption, then at S2 the content copier 23a copies the content data of that sector and its sector ID and stores the content data of that sector identified by its sector ID number or an ID that relates the content data to its sector ID. Then at S3, the content encrypter 23b encrypts the copied sector content data using an appropriate encryption technique such as RSA or AES as mentioned above, and at S4 outputs the encrypted content data together with the corresponding sector ID to the data assembler 25.

The content encrypter 23b may carry out the encryption at S3 on the copied content data for each sector to be subject to CSS encryption. As another possibility, the content encrypter 23b may be configured to encrypt only sufficient data to inhibit decoding of the MPEG data, which data may be selected from the list comprising: certain frames of MPEG content data; key frames; sufficient intraframes frames (I-frames); portions of I-frames such as I-frame headers; and p-frame slices. Thus as an example, only the copied content data for sectors representing the most critical data such as key frames or intraframes frames (I-frames) of the received MPEG data. Not all the critical data need be encrypted, rather only the proportion of the sectors containing I-frames sufficient to ensure the I-frame cannot be decoded need be encrypted. This reduces the amount of encryption required and should speed up the content reproducing process yet still provide effective protection because, in accordance with the MPEG standard (to which reference should be made for further details), the I-frames are the frames which contain all of their content data and a reading apparatus or DVD player needs to be decrypt the content data of an I-frame to reproduce any predicative frame (P-frame) and bi-directional frame (B-frame) dependent on that I-frame.

As shown in FIG. 9, the CSS processor 22 processes the content data flagged for CSS encryption by, when the CSS protector determines at S5 that a sector has been flagged for encryption, carrying out the CSS encryption process on the content data of that sector in accordance with the CSS license at S6 and then outputting the sector at S7, including the sector header and the CSS encrypted sector content data to the data assembler 25.

Figure 10:
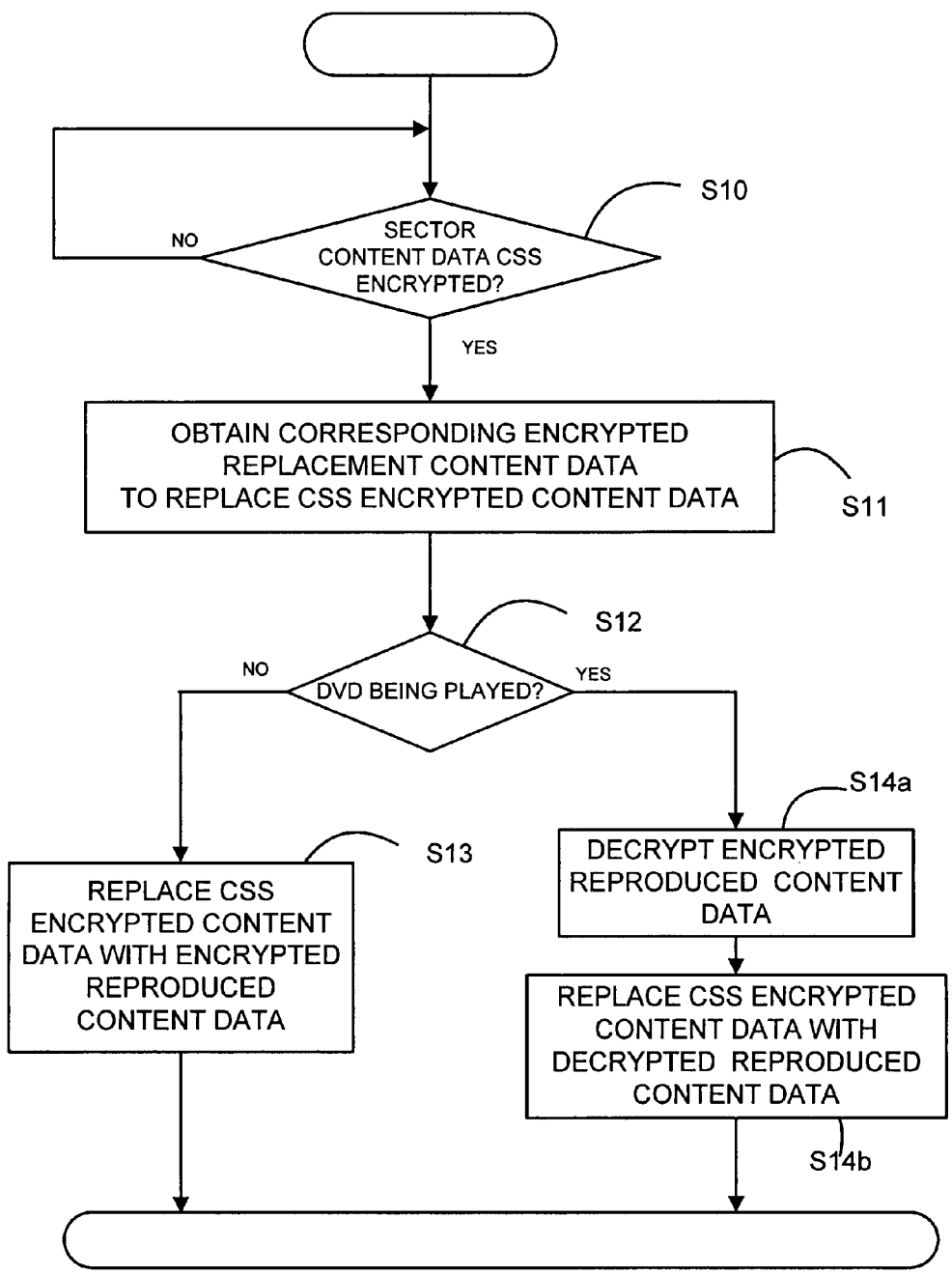
FIG. 10 shows a flow chart for explaining operations carried out by the reading apparatus shown in FIG. 2.

FIG. 10 shows a flow chart providing an overview of the operation of reading apparatus 50, under control of its controller 51, where the DVD is a CSS-encrypted DVD. The reading apparatus will operate to read sectors of the DVD in normal manner (whether simply to play the DVD or to produce a copy of its contents) in accordance with instructions received from the controller 51 or the navigator 63 and to display this to a user on the video display of the user output. However, when at S10 in FIG. 10, the CSS encrypted sector identifier 54 identifies from the non-scrambled information in the sector header that the sector read by the reader 52 has CSS encrypted content data, then at S11 the controller 51 instructs the replacement content data obtainer 55 to obtain the encrypted reproduced content data for that sector using the sector ID. Once the replacement content data obtainer 55 has obtained the encrypted reproduced content data, then at S12, if the DVD is simply to be played, the controller 51 instructs the decryptor 56 which at S14a decrypts the obtained encrypted reproduced content data by the inverse of the encryption technique (for example AES or RSA as mentioned above) and at S14b replaces the CSS encrypted content data for that sector with the decrypted reproduced content data. If however the DVD is not to be played but its content is to be copied then at S12 the controller instructs the reproducer 57 which at S13 replaces the CSS encrypted content data for that sector with the encrypted reproduced content data. This process is repeated for each sector read from the DVD.

Figure 11:
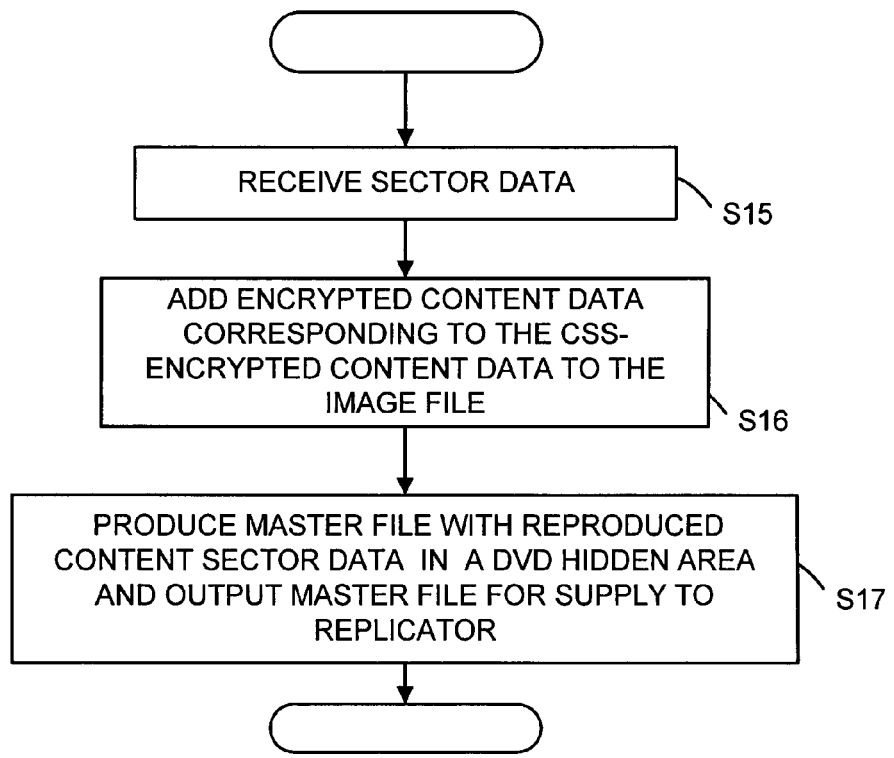
FIG. 11 shows a flow chart for illustrating one way in which the encrypted reproduced content data may be provided to replace CSS encrypted content data.
Figure 12:
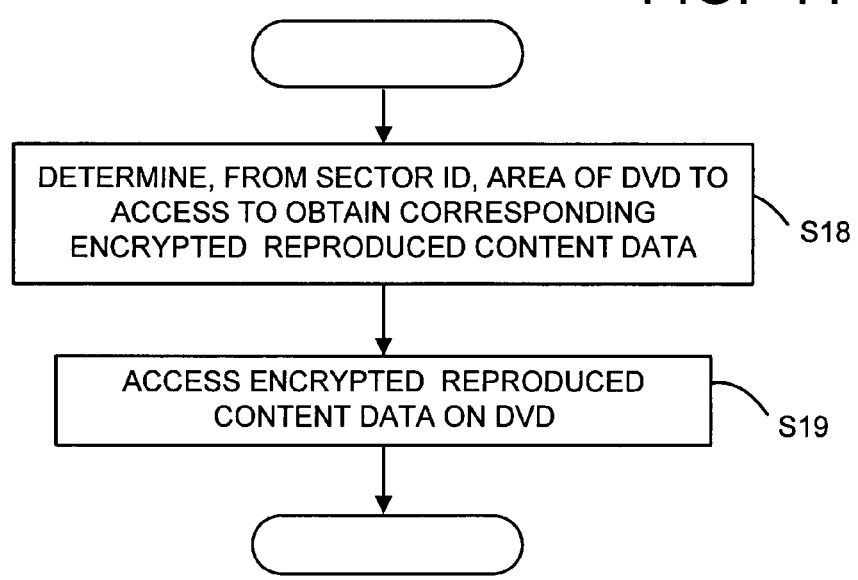
FIG. 12 shows a flow chart for illustrating one way in which encrypted reproduced content data may be obtained where encrypted reproduced content data is provided in the manner illustrated by FIG. 11.

FIGS. 11 and 12 show flowcharts for explaining operations carried out by the producing apparatus and the reading apparatus FIGS. 11 and 12 show flowcharts for explaining operations carried out by the producing apparatus and the reading apparatus, respectively, when the reproduced content data provided by the content reproducer 23 is recorded in a part of the DVD not usually accessed or accessible by a reading apparatus or player.

Figure 17:
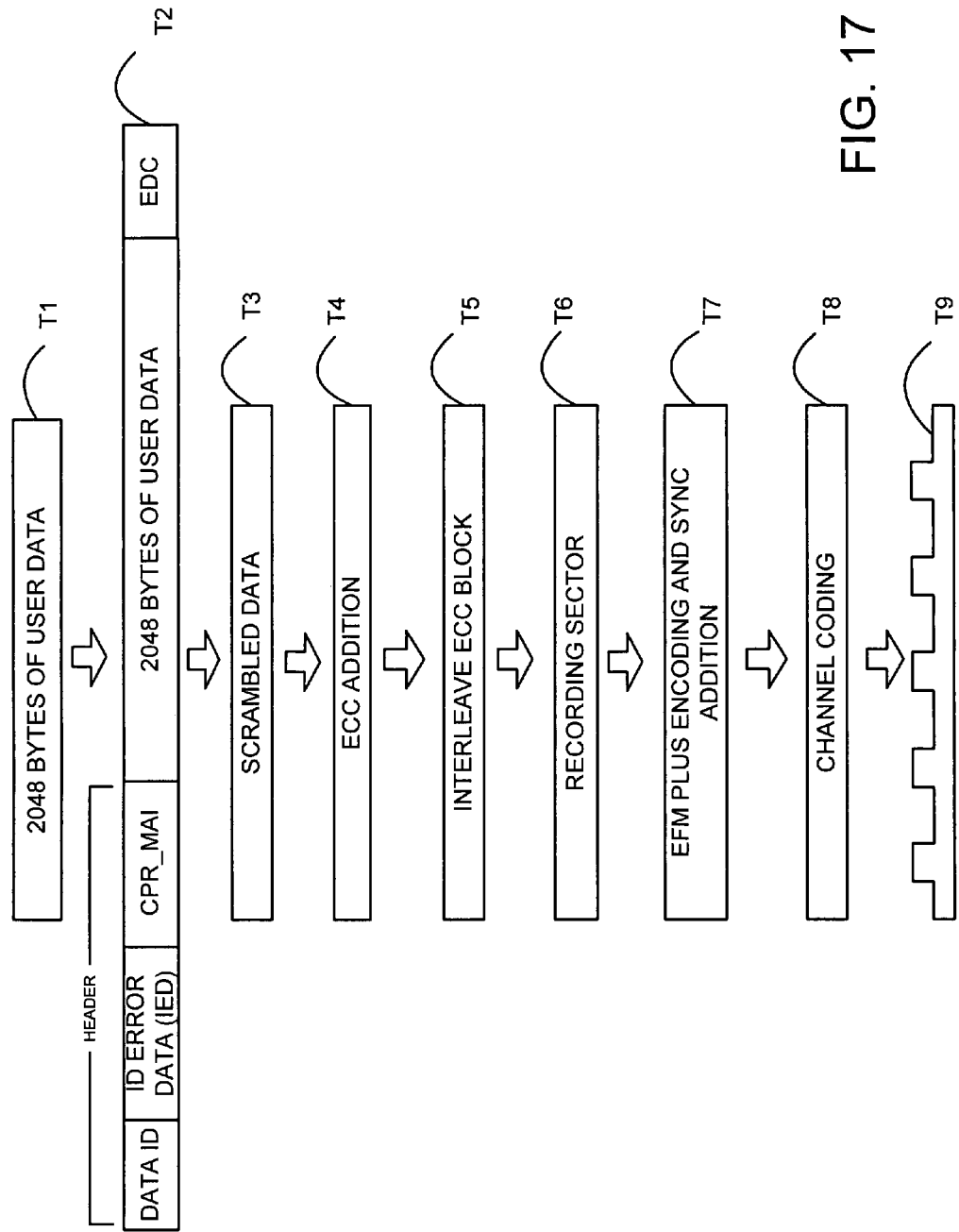
FIG. 17 shows a diagram for explaining an optical disc production process.

In FIG. 11, at S15 the data assembler 25 receives the authored file (DPP File Set) from the data receiver 21 and also receives replacement content data for the sectors having CSS-encrypted content data from the content reproducer 23. At S16, under the control of the master provider controller 24, the data assembler inserts the replacement content data sectors and makes any necessary adjustments to the filing system structures required to produce a modified authored file (DPP File Set) containing the replacement content data, identified by the corresponding sector IDs, in a part of the authored file (DPP File Set) that will be recorded on a "hidden" area of the DVD, for example an area not on the navigation path(s) of the DVD), and supplies the thus modified authored file (DPP File Set) to the master data encoder 27. Then at S17, the master data encoder 27 carries out, under the control of the master provider controller 24, conventional mastering processes to encode the authored file (DPP File Set) in accordance with the appropriate DVD standard specification and so produce channel code data for recording as illustrated schematically by FIG. 17. Thus, in accordance with the appropriate DVD standard specification, each sector of user data (T1 in FIG. 17) has a data ID, ID error data IED, copyright management data CPR_MAI, 2048 bytes of user data and error detection code (T2 in FIG. 17), and processes such as scrambling (T3 in FIG. 17), error code correction (ECC) addition to create ECC blocks (T4 in FIG. 17), interleaving of the data and parity rows (T5 in FIG. 17) of each ECC block, breaking up of the interleaved ECC blocks into recording sectors or frames (T6 in FIG. 17), EFM plus encoding and SYNC code addition (T7 in FIG. 17, and channel coding (T8 in FIG. 17), are carried out in accordance with the appropriate DVD standard specification.

The master data encoder 27 produces a digital linear tape containing the modified authored file (DPP File Set) for supply to a replicator 11 which may be remotely located. As another possibility, the data may be supplied to the replicator over a network which may be a local network or the Internet, for example. The replicator 11 produces a glass master carrying the image file and physical sector address tags mapping the logical sector numbers to the actual sectors on the glass master. This glass master is then used at to produce stamping masters from which the final DVD discs are produced (T9 in FIG. 17).

Thus DVDs are produced which carry the CSS-encrypted DVD title and also, in a "hidden" area of the DVD, encrypted reproduced content data for use by a reading apparatus that does not have a CSS license. Of course, a CSS-licensed reading apparatus may simply access the CSS-encrypted DVD title as normal.

Figure 7:
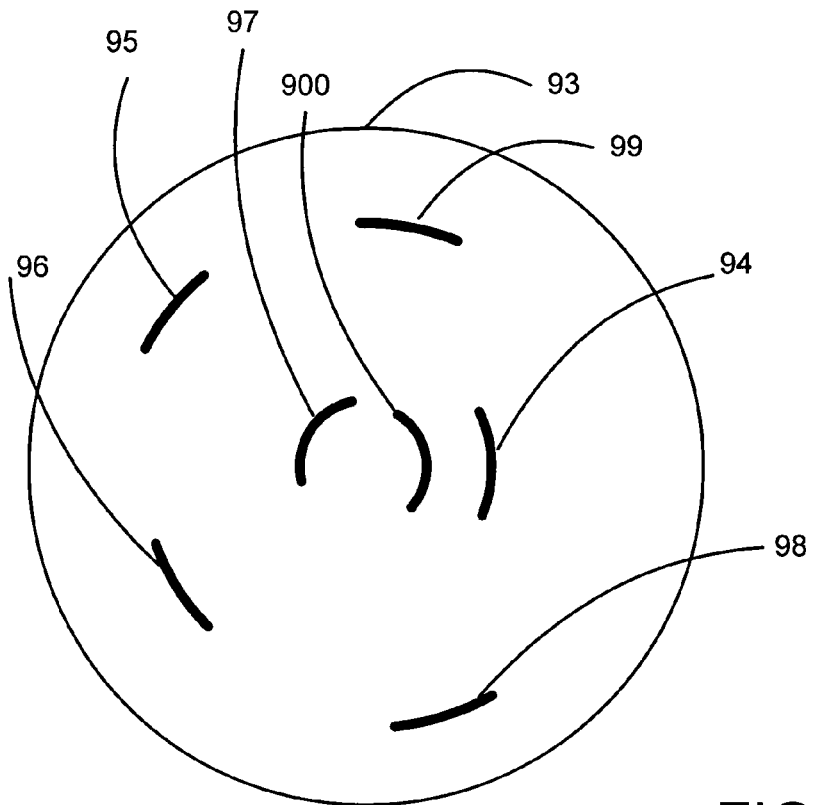
FIG. 7 shows a much simplified schematic representation of sectors on a DVD surface.

FIG. 7 shows a much simplified schematic representation of some of the sectors (all of which are, as is conventional of the same length/size) on a resulting DVD surface 93 with, for example, sectors 95, 98 and 99 being CSS encrypted sectors and sectors 94 and 96 being non-CSS encrypted sectors and sector 97 providing a disc ID. Sector 900 may be a hidden area.

FIG. 12 shows a flowchart for explaining operations carried out at S11 in FIG. 10 by a reading apparatus that does not have a CSS license. When the controller 51 determines, upon initial reading of a DVD that the DVD is a CSS-encrypted DVD then, when the CSS encrypted sector identifier 54 identifies a sector that contains CSS encrypted content data, the controller 51 instructs the replacement content data obtainer 55 at S18 to determine from the sector ID and data stored by the replacement content data obtainer 55 the "hidden" area of the DVD that contains the replacement content data for that CSS-encrypted content data sector. The address of this hidden area may be stored in a reserved field in the ISO9660 primary volume descriptor. At S19, the controller 51 controls the reader 52 to access that area of the DVD and to supply the read replacement content data to the replacement content data obtainer 55. The reading apparatus then proceeds as described above with reference to S12 to S14b of FIG. 10.

FIGS. 13 to 16 show flowcharts for explaining operations carried out when the reproduced content data provided by the content reproducer 23 is not recorded in a part of the DVD but is stored by a separate content storer.

Figure 13:
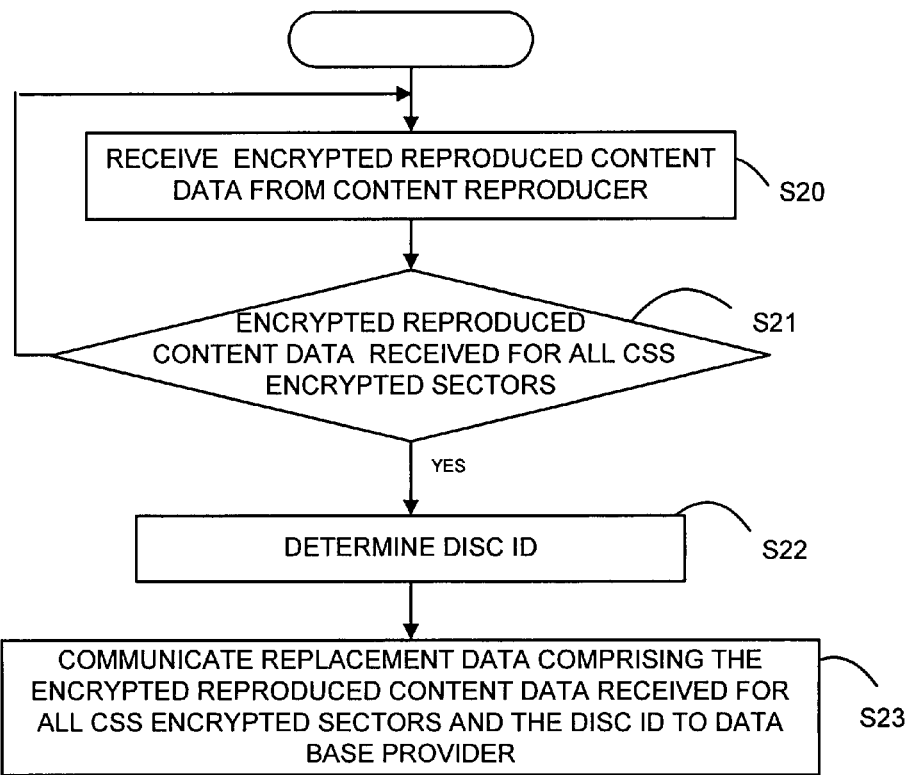
FIGS. 13 and 14 show flow charts for illustrating another way in which encrypted reproduced content data may be provided to replace CSS encrypted content data.
Figure 14:
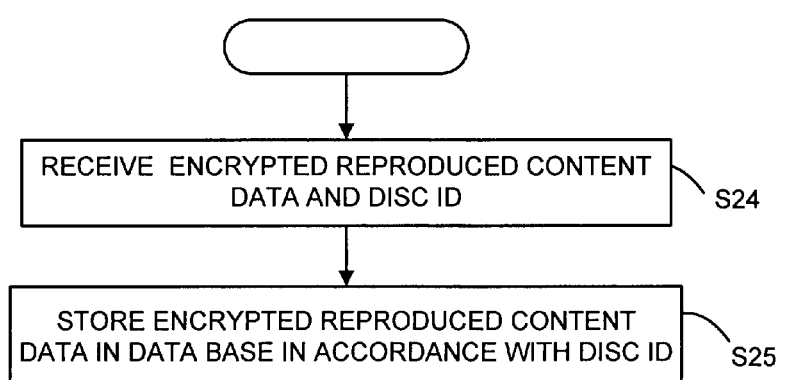

FIGS. 13 and 14 show flowcharts for explaining operations carried out to store the reproduced content data at or in a separate content storer.

At S20 in FIG. 13, the reproduced content provider 26, under control of the controller 24, receives encrypted reproduced content data, identified by the sector ID of the corresponding CSS encrypted sector, from the content reproducer 23. When at S21, the reproduced content provider 26 determines that it has received encrypted reproduced content data for each CSS encrypted sector of the DVD, the reproduced content provider 26 determines at S22 the disc ID that the DVDs that are being produced from the authored file (DPP File Set) will have and associates this with the reproduced content data containing the encrypted reproduced content data for all of CSS encrypted sectors to provide a reproduced content data file. As another possibility or additionally, if the authored file (DPP File Set) includes a watermark, then the reproduced content provider 26 may associate the watermark with the reproduced content data file. As another possibility or additionally, the reproduced content provider 26 may produce from data in the authored file (DPP File Set) a digital fingerprint that uniquely identifies the authored file (DPP File Set) and thus the DVD and associate this with the reproduced content data file.

At S23 in FIG. 13, the reproduced content provider 26 causes the reproduced content data file to be stored by the content storer. This content storer may be a portable storage device (such as another DVD or a solid state or hard disc drive storage device) that may be sold separately from the DVD carrying the CSS encrypted title. In this example, however, the content storer is as shown in FIG. 3 a remote content storer 70 (FIG. 3) and so the reproduced content provider 26 communicates with the remote content storer to transmit the reproduced content data file on a secure channel and/or in a communications-encrypted form to the content storer 70 via the network 80.

When at S24 in FIG. 14, the content storer 70 receives such a reproduced content data file, then the controller 72 of the content storer 70 causes the reproduced content data file to be stored at S25 in the data base 71 (FIG. 3) at an address or location determined by its corresponding disc ID. This procedure may of course be repeated for many different DVD titles so that the data base 71 stores a respective reproduced content data file for each of those titles.

Figure 15:
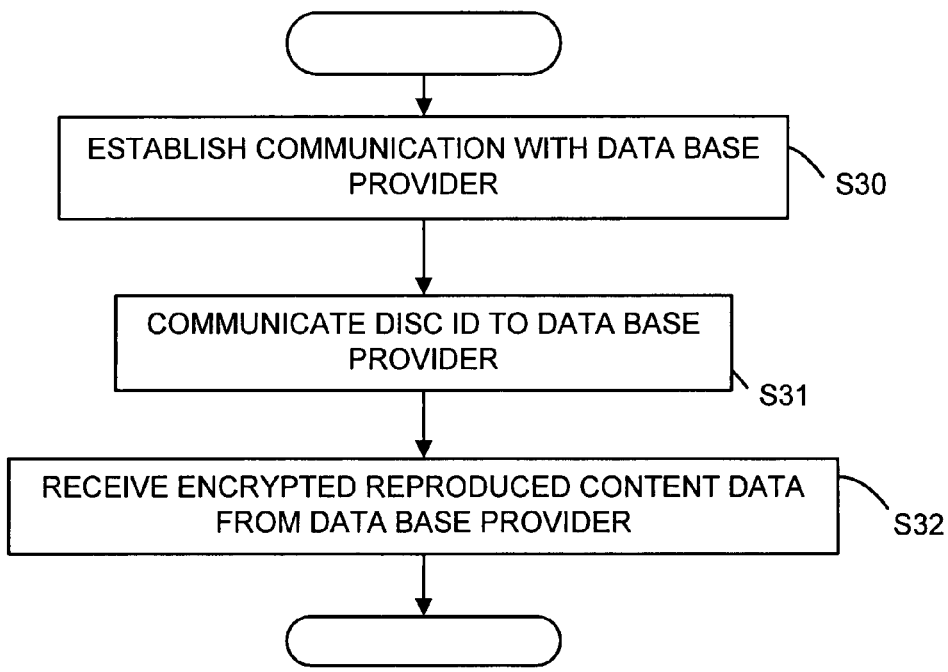
FIGS. 15 and 16 show flow charts for illustrating one way in which encrypted reproduced content data provided in the manner illustrated by FIGS. 13 and 14 may be obtained.
Figure 16:
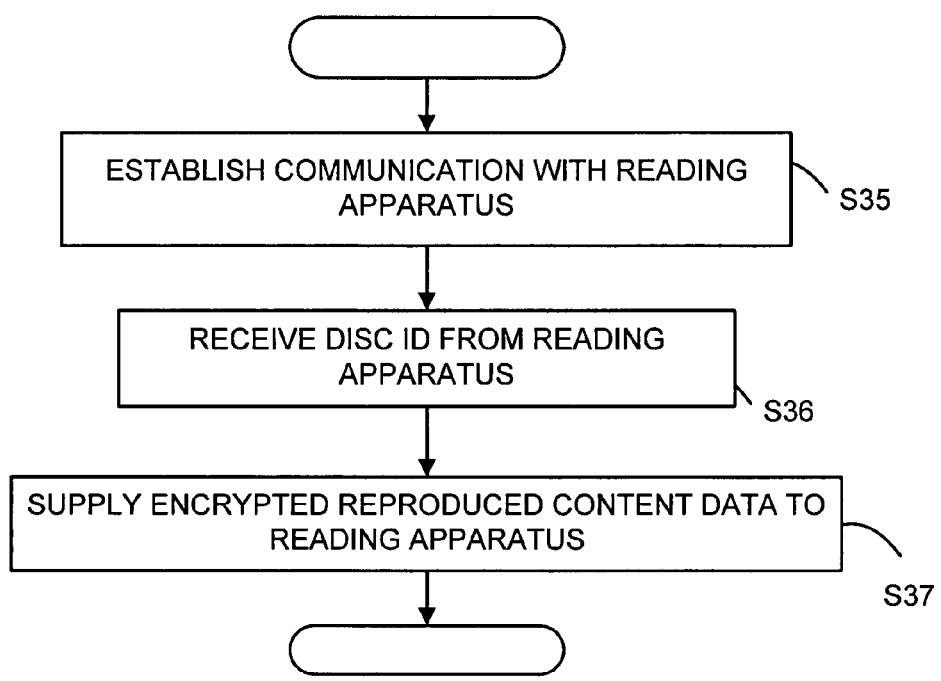

FIGS. 15 and 16 show flowcharts for explaining operations carried out by a reading apparatus that does not have a CSS license, where the reproduced content data file is not stored on the DVD itself but is stored by a separate storage device, for example the data base 71 shown in FIG. 3. When the controller 51 of the reading apparatus determines, upon initial reading of a DVD, that the DVD is a CSS-encrypted DVD then, at S30, the controller 51 causes the replacement content data obtainer 55 to establish communication with the content or data base provider 70 and thence at S31 to communicate the disc ID to the content storer 70. When, communication is established with the content storer 70 at S35 in FIG. 16 and the content storer 70 has received the disc ID at S36 (assuming that the content storer 70 does not advise the replacement content data obtainer 55 that it cannot locate the received disc ID), then at S37 in FIG. 16, the content storer 70 communicates, via a secure channel or in an encrypted file, the encrypted reproduced content data file containing all of the reproduced content data corresponding to the received disc ID to the content data obtainer 55 which receives it at S32 in FIG. 15. Once the content data obtainer 55 has received the encrypted reproduced content data file then the reading apparatus proceeds as explained above with reference to S12 to S14b in FIG. 10.

As described above, the producing apparatus shown in FIG. 1 may be capable of producing reproduced content data to be stored on the same DVD as the corresponding CSS encrypted DVD title and may be capable of producing reproduced content data to be stored separately from the DVD title, for example at a location on a network as discussed above with reference to FIG. 3. The producing apparatus may be capable of implementing both or either one of these options.

As described above, the reading apparatus shown in FIG. 2 may be capable of obtaining reproduced content data from the same DVD as the corresponding CSS encrypted DVD title or may be capable of obtaining reproduced content data stored separately from the DVD title. The reading apparatus may be capable of implementing both or either one of these options. As another possibility, the reading apparatus may combine these options. For example, the reading apparatus may be configured first to check whether reproduced content data is available on the same DVD and, if not, then to check whether reproduced content data is available from a separate storage device, or vice versa. The reading apparatus may be configured to check one or more separate storage devices for reproduced content data. For example the reading apparatus may be configured, in any appropriate order, to check for already downloaded reproduced content data stored by the reading apparatus, to check for a removable medium carrying the reproduced content data, to prompt the user to install or couple to the reading apparatus an external storage device carrying the reproduced content data, to check or prompt the user to check for availability of the reproduced content data via network such as the Internet.

Although the above description refers to the CSS encryption scheme, apparatus and a method embodying the invention may be applied where other proprietary schemes or systems are used to encrypt content data.

As shown in FIG. 1, the producing apparatus 1 has both authoring functionality (asset receiver 5, asset encoder 6 and authorer 7) and a file receiver 9b. Where appropriate the apparatus may include only one of these, that is either the authoring functionality or the file receiver 9b.

In the above-described embodiments, the recording medium is a DVD. The recording medium may be another form of optical disc. It will, of course, be appreciated that the present invention may be applied to other forms of digital recording media such as, for example, magnetic or magneto-optical recording discs. In addition, as described above, the recording medium is a disc that is read by spinning or rotating the disc about a central axis. It may, however, also be possible to apply the present invention to digital recording media in the form of Digital Linear Tape which is transported along a path past, rather than rotated with respect to, a read/write head, or may be any other form of recording medium from which content data that can be accessed in a non-sequential manner using
navigational data stored by the recording medium. The recording medium may be a precursor to the product that is supplied to the end user, for example in the case of an optical disc the recording medium may be a Digital Linear Tape, a glass master, or a stamping master.

What is claimed is:

1. Apparatus to provide content data, the apparatus comprising:
   a data receiver to receive an authored file having content data and data identifying sectors of the authored file that are to be encrypted in accordance with a first encryption technique that requires a decryption key or keys;
   an encrypter coupled to the data receiver to encrypt content data by carrying out the encryption process on the sectors of the authored file flagged for encryption to produce encrypted content data for recordation on a recording medium;
   a content reproducer coupled to the data receiver to receive the authored file and to provide reproduced content data, the content reproducer comprising:
      a content copier to copy the content data of each sector of the authored file flagged for encryption, and
      a reproduced content data encrypter to encrypt content data of at least some of the sectors flagged for encryption in accordance with a second encryption technique different from the first encryption technique to produce the reproduced content data; and
   a reproduced content data provider to provide the reproduced content data for access by a reading apparatus in place of the encrypted content data, the reproduced content data provider causing the reproduced content data to be stored on the same recording medium as the encrypted content data, wherein the reproduced content data is stored in a control area or a sector that does not form part of a navigational path of the recording medium used by the reading apparatus to play content.

2. Apparatus according to claim 1, wherein the reproduced content data encrypter encrypts I frames of MPEG content data.

3. Apparatus according to claim 1, wherein the reproduced content data provider causes the reproduced content data to be stored at a different location from the encrypted content data.

4. Apparatus according to claim 1, wherein the reproduced content data provider causes the reproduced content data to be stored at a location remote from the encrypted content data.

5. Apparatus according to claim 1, wherein the reproduced content data provider causes the reproduced content data to be stored by at least one of a network storage device and a portable storage device separate from the recording medium on which encrypted content data is recorded.

6. Apparatus according to claim 1, wherein the recording medium comprises an optical disc and the reproduced content data encrypter encrypts only sufficient data to inhibit decoding of the MPEG data, which data is selected from the list comprising: certain frames of MPEG content data; key frames; sufficient intraframes frames (I-frames); portions of I-frames; and p-frame slices.

7. Apparatus according to claim 1, wherein the encrypter uses CSS encryption.

8. A method of providing content data, the method comprising:
   receiving an authored file having content data and data identifying sectors of the authored file that are to be encrypted in accordance with a first encryption technique that requires a decryption key or keys;
   encrypting content data of the authored file by carrying out an encryption process using the first encryption technique on the sectors of the authored file flagged for encryption to produce encrypted content data for recordation on a recording medium;
   reproducing content data of the authored file by copying the content data of each sector of the authored file flagged for encryption and encrypting content data of at least some of the sectors flagged for encryption in accordance with a second encryption technique different from the first encryption technique to produce reproduced content data;
   providing the reproduced content data for access by a reading apparatus in place of the encrypted content data; and
   causing the reproduced content data to be stored on the same recording medium as the encrypted content data, wherein the reproduced content data is stored in a control area or a sector that does not form part of a navigational path of the recording medium used by the reading apparatus to play content.

9. A method according to claim 8, wherein only sufficient data to inhibit decoding of the MPEG data is encrypted using the second encryption technique.

10. A method according to claim 8, wherein the content data encrypted in accordance with the second encryption technique is selected from a list comprising: certain frames of MPEG content data; key frames; sufficient intraframe frames (I-frames); I-frame headers; and p-frame slices.

11. A method according to claim 8, wherein the first encryption technique is CSS encryption.

12. A method according to claim 8, further comprising storing the reproduced content data at a remote location on a different storage device than the same recording medium, or at a network location.

13. A non-transitory computer readable medium having stored thereon sequences of instructions, the sequences of instructions including instructions, which, when executed by a processor, cause the processor to perform:
   receiving an authored file having content data and data identifying sectors of the authored file that are to be encrypted in accordance with a first encryption technique that requires a decryption key or keys;

encrypting content data of the authored file by carrying out an encryption process using the first encryption technique on the sectors of the authored file flagged for encryption to produce encrypted content data for recordation on a recording medium;

reproducing content data of the authored file by copying the content data of each sector of the authored file flagged for encryption and encrypting content data of at least some of the sectors flagged for encryption in accordance with a second encryption technique different from the first encryption technique to produce reproduced content data;

providing the reproduced content data for access by a reading apparatus in place of the encrypted content data; and causing the reproduced content data to be stored on the same recording medium as the encrypted content data, wherein the reproduced content data is stored in a control area or a sector that does not form part of a navigational path of the recording medium used by the reading apparatus to play content.

\* \* \* \* \*